(12) United States Patent
Sugimoto et al.

(10) Patent No.: US 6,886,646 B2
(45) Date of Patent: May 3, 2005

(54) SELF-PROPELLED OPERATING MACHINE

(75) Inventors: Yasuhiro Sugimoto, Wako (JP); Hiroshi Sueshige, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/460,721

(22) Filed: Jun. 12, 2003

(65) Prior Publication Data

US 2003/0234133 A1 Dec. 25, 2003

(30) Foreign Application Priority Data

Jun. 24, 2002 (JP) ........................................ 2002-183209
Jun. 24, 2002 (JP) ........................................ 2002-183261

(51) Int. Cl.[7] .............................................. B62D 11/02
(52) U.S. Cl. ...................... 180/6.48; 74/606 R; 180/6.2
(58) Field of Search ........................ 180/6.2, 6.3, 6.48; 74/606 R; 60/456, 487–492; 403/363, 373, 381

(56) References Cited

U.S. PATENT DOCUMENTS

| | | | | |
|---|---|---|---|---|
| 4,809,796 A | * | 3/1989 | Yamaoka et al. | 180/6.48 |
| 5,277,512 A | * | 1/1994 | Dwillies | 403/348 |
| 5,412,947 A | * | 5/1995 | Hirose | 60/454 |
| 5,622,051 A | * | 4/1997 | Iida et al. | 60/456 |
| 5,713,420 A | * | 2/1998 | Roberts et al. | 172/42 |
| 5,850,886 A | * | 12/1998 | Kouno et al. | 180/6.24 |
| 6,073,443 A | * | 6/2000 | Okada et al. | 60/456 |
| 6,125,954 A | * | 10/2000 | Oota et al. | 180/6.48 |
| 6,237,332 B1 | * | 5/2001 | Thoma et al. | 60/456 |

FOREIGN PATENT DOCUMENTS

| | | |
|---|---|---|
| JP | 56013137 | 3/1981 |
| JP | 4013430 | 2/1992 |

* cited by examiner

Primary Examiner—Lesley D. Morris
Assistant Examiner—L. Lum
(74) Attorney, Agent, or Firm—Adams & Wilks

(57) ABSTRACT

A self-propelled operating machine has a power source, a hydraulic CVT for varying power outputted from the power source, and a transmission mechanism connected to the hydraulic CVT for transmitting power outputted from the hydraulic CVT. A stand is mounted between the transmission mechanism and the power source so as to enclose the hydraulic CVT. The stand has an oil passage through which hydraulic oil of the hydraulic CVT flows. A cooling fan cools the oil passage of the stand to thereby cool the hydraulic oil of the hydraulic CVT flowing through the oil passage. The cooling fan is disposed between the power source and the hydraulic CVT so as to be enclosed by the stand.

17 Claims, 13 Drawing Sheets

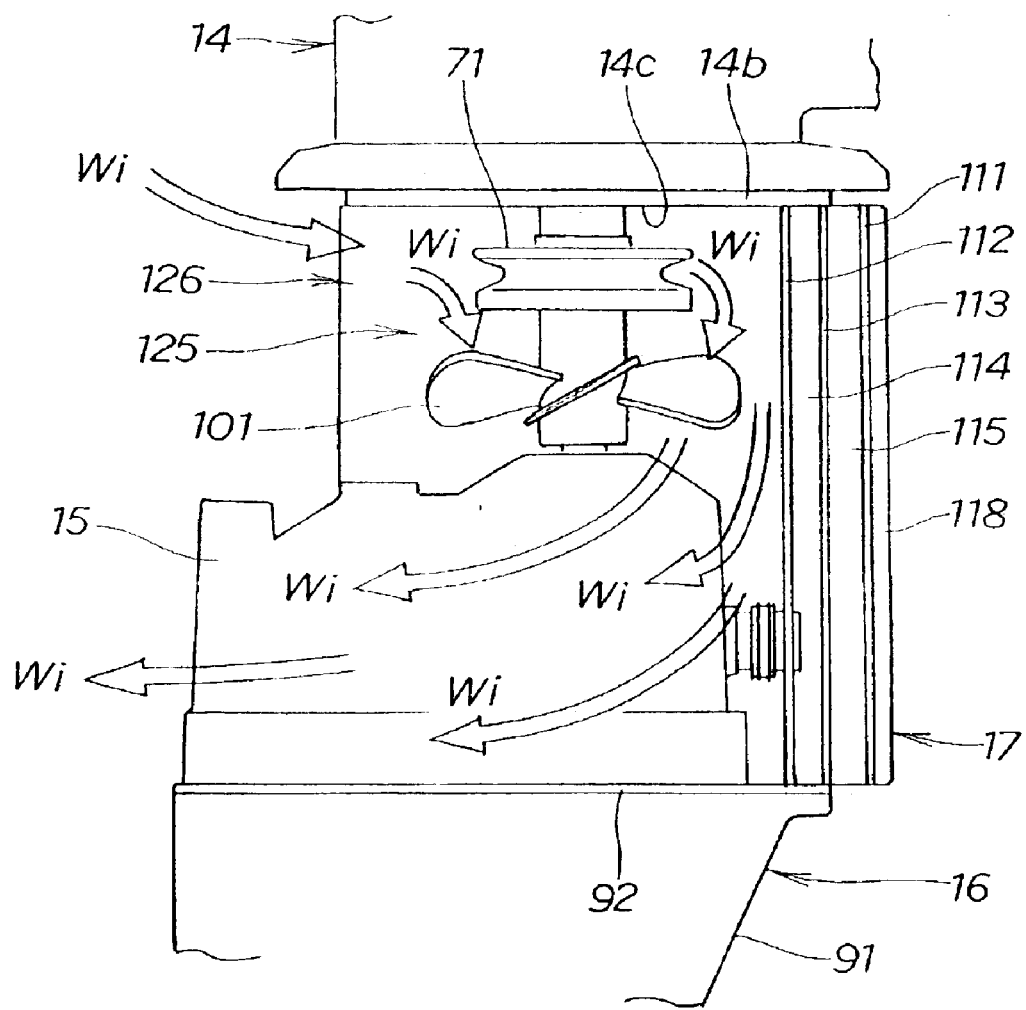

FIG. 12A
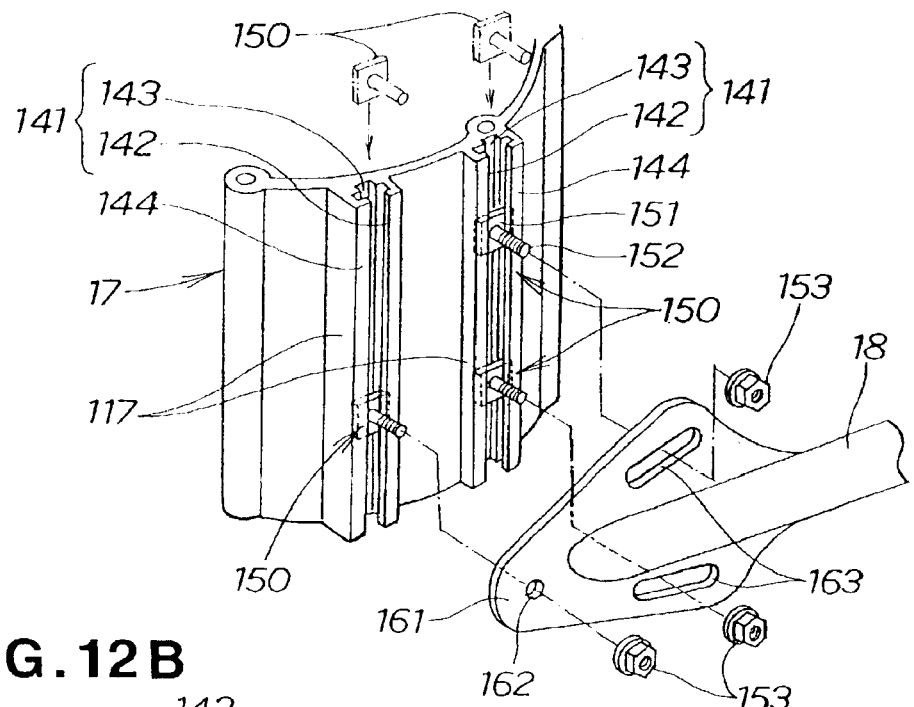
FIG. 12B
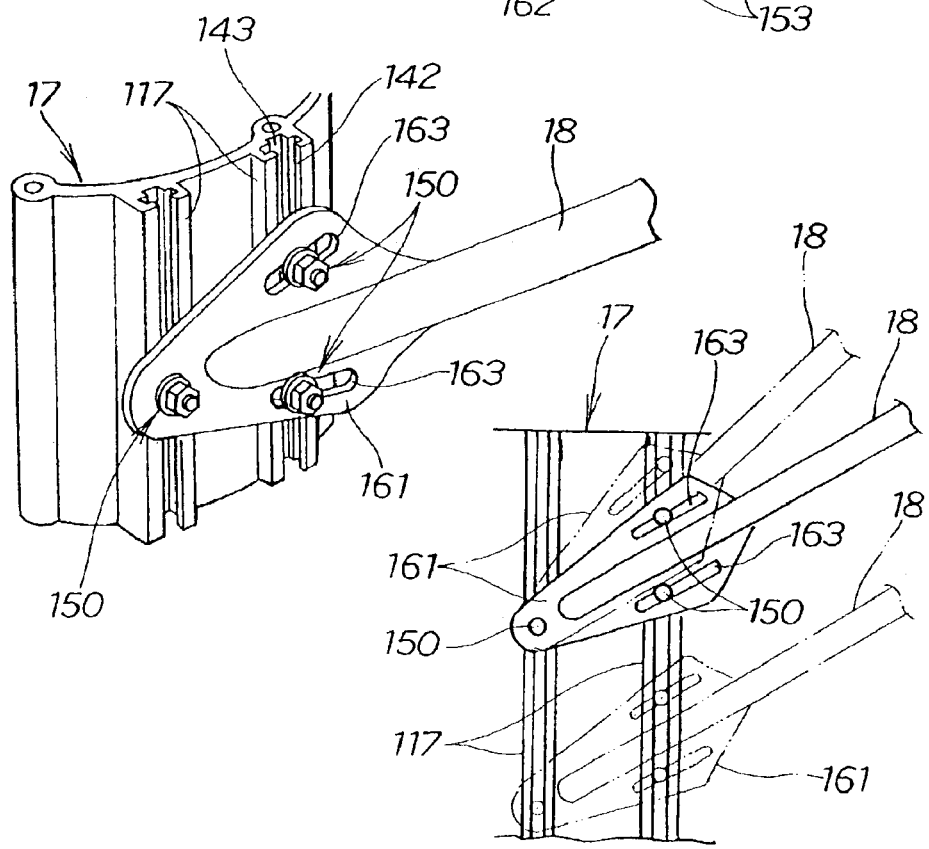
FIG. 12C

SELF-PROPELLED OPERATING MACHINE

BACKGROUND OF THE INVENTION

The present invention relates to self-propelled operating machines, such as carrier vehicles, snowplows and cultivators, which are propelled by power from power sources, and more particularly, to self-propelled operating machines configured to transmit power from power sources via hydraulic systems and hydraulic CVTs (Continuous Variable Transmissions) to transmission mechanisms and to transmit the power from the transmission mechanism to axles and various loads.

BACKGROUND INFORMATION

A self-propelled operating machine identified as a "Power Agricultural Machine with Hydraulic System" is disclosed, for example, in Japanese Utility Model Laid-Open Publication No. SHO-56-13137. This power agricultural machine is not equipped with an oil cooler for cooling hydraulic oil. To prevent the heating of hydraulic oil, it is required to employ a hydraulic system having a sufficient reserve output.

As a self-propelled operating machine having an oil cooler, a "Carrier Vehicle" disclosed in Japanese Utility Model Laid-Open Publication No. HEI-4-13430, for example, is known. This carrier vehicle will be briefly described below with reference to FIGS. 13A and 13B.

A self-propelled operating machine 300 shown in FIGS. 13A and 13B is a crawler-type carrier vehicle having crawler units 302, 302 provided on the left and right of a machine base 301, an engine compartment 303 provided on an upper front portion of the machine base 301, and a dump bed 304 provided on an upper rear portion of the machine base 301. This self-propelled operating machine 300 transmits power from an engine 305 via a hydraulic CVT 306 to a gear transmission mechanism 307 and transmits the power from the gear transmission mechanism 307 to axles 308 of the crawler units 302, 302 for propulsion. The hydraulic CVT 306 and an oil cooler 309 are disposed within the engine compartment 303. The oil cooler 309 cools the hydraulic oil of the hydraulic CVT 306.

In the above self-propelled operating machine 300, however, above the gear transmission mechanism 307, the oil cooler 309, engine 305 and hydraulic CVT 306 are arranged from the front to the rear in this order. The arrangement of these units 305, 306 and 309 requires a large space. This inevitably makes the size of the self-propelled operating machine 300 large.

It may be possible to stack the units 305, 306 and 309 on the gear transmission mechanism 307 to reduce arrangement space. This, however, renders the configuration of fixing the units 305, 306 and 309 complex and increases the number of fixing parts and the production costs, leaving room for improvement.

Thus, there is a need for a self-propelled operating machine having an oil cooler for cooling a hydraulic CVT for transmitting power of a power source to a transmission mechanism and the hydraulic oil of the hydraulic CVT, and having a simple configuration for reduction in size of the self-propelled operating machine and a high cooling efficiency by the oil cooler.

SUMMARY OF THE INVENTION

In the present invention, there is provided a self-propelled operating machine which comprises: a power source, a hydraulic CVT for varying power outputted from the power source; a transmission mechanism supporting the hydraulic CVT for transmitting power outputted from the hydraulic CVT to axles; and a stand mounted on the transmission mechanism extending from the bottom of the hydraulic CVT to an upper level above the top of the hydraulic CVT and supporting the power source, the stand having a cooling passage for cooling the hydraulic oil of the hydraulic CVT passed therethrough.

By providing the cooling passage for cooling the hydraulic oil of the hydraulic CVT passed therethrough in the stand for mounting the power source on the transmission mechanism, the stand can also serve as an oil cooler for cooling the hydraulic oil. This eliminates the need for an oil cooler for that single purpose and an oil cooler mounting member. Installation space for the oil cooler can thus be reduced with the simple configuration to reduce the size of the self-propelled operating machine and also reduce the number of components and production costs.

Further, by mounting the stand also serving as an oil cooler and the hydraulic CVT on the transmission mechanism and extending the stand to a higher level than the hydraulic CVT to mount the power source, the power source, hydraulic CVT and transmission mechanism constituting the power train can be put together. The simple configuration can thus further reduce the installation space for the power train to reduce the size of the self-propelled operating machine, and also simplify the fixing structure of fixing the power train.

The stand is preferably configured to enclose the hydraulic CVT. Since the stand also serves as an oil cooler, the distance between the oil cooler and the hydraulic CVT can be reduced. An oil pipe between the oil cooler and the hydraulic CVT can thus be shortened.

The self-propelled operating machine of the present invention preferably further comprises: an output shaft extending downward from the power source; and input shaft extending upward from the hydraulic CVT and to which the output shaft is connected; and an air cooling fan mounted on the output shaft or input shaft for sending air from top to bottom. That is, the cooling fan is interposed between the power source and the hydraulic CVT. The inner wall surface of the oil cooler, the undersurface of the drive source and the outer surface of the hydraulic CVT can thus be forcedly cooled, resulting in efficient cooling thereof. Further, there is no need to provide an additional space for disposing the air cooling fan. The air cooling fan can thus be easily disposed in such a narrow space enclosed by the stand. Further, the stand can enclose the air cooling fan, thereby also servicing as a fan cover. This eliminates the need for a fan cover, reducing the number of components.

Further, in the present invention, the self-propelled operating machine preferably further comprises left and right operating handles extending rearward from the stand to allow an operator to control the operating handles while walking. That is, there is less limitation in mounting space of the operating handles as compared with the case of extending the operating handles from the body of the operating machine. The mounting space of the operating handles can thus be more easily provided.

Further, in the present invention, the self-propelled operating machine preferably further comprises: guide grooves of a T shape in cross section formed to extend over the height of the stand; and fasteners for fixing the operating handles, fitted into the guide grooves movably along the guide grooves while restricted in rotation within the guide grooves; wherein, the operating handles are supported at a desired position on the stand with the fasteners. Thus allowing the operating handles to be secured at a desired position to the stand with the fasteners facilitates the adjustment in height of the operating handles. An operator can desirably adjust the height of the operating handles according to his or her preference.

BRIEF DESCRIPTION OF THE DRAWINGS

Preferred embodiments of the present invention will be described in detail below, by way of example only, with reference to the accompanying drawings, in which:

FIGS. 10 and 11 are functional diagrams of the self-propelled operating machine, illustrating flows of air caused by the rotation of a cooling fan;

FIGS. 12A to 12C are diagrams illustrating a structure of mounting a handle to the stand.

DETAILED DESCRIPTION OF THE PREFERRED EMBODIMENTS

Figure 1:
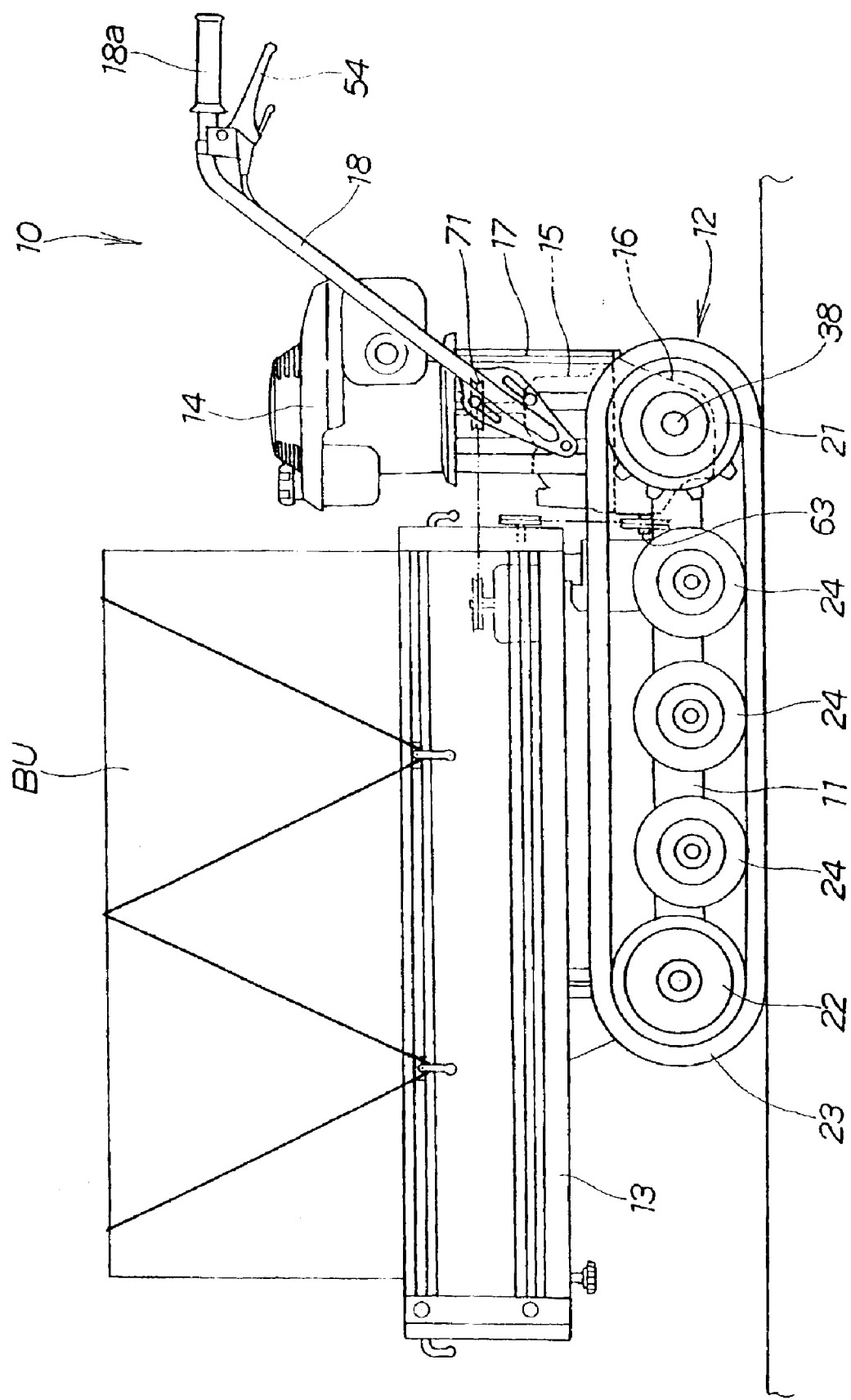
FIG. 1 is a left side view of a crawler-type carrier vehicle exemplifying a self-propelled operating machine according to the present invention.

FIG. 1 illustrates a crawler-type carrier vehicle exemplifying a self-propelled operating machine 10. The carrier vehicle 10 includes a pair of left and right crawler belt units 12, 12 (see FIG. 2) provided at a body frame 11, a load-carrying platform 13 mounted on top of the body frame 11, an engine 14, hydraulic CVT 15, transmission mechanism 16 and stand 17 mounted on a rear portion of the body frame 11, and operating handles 18 extending obliquely rearward and upward from the stand 17.

The engine 14 is a drive source for the self-propelled operating machine 10. The self-propelled operating machine 10 is driven by the engine 14 via the pair of left and right crawler belt units 12, 12 for self propulsion. More specifically, the crawler carrier vehicle 10 shown in FIG. 1 is a walk-behind self-propelled operating machine which is maneuvered by an operator not shown walking with the operating handles 18.

Each crawler belt unit 12 includes a drive wheel 21 mounted at the rear of the body frame 11, a driven wheel 22 mounted at the front of the body frame 11, and a crawler belt 23 running between the drive wheel 21 and the driven wheel 22. The crawler belt unit 12 includes a plurality of rotary wheels 24. Reference characters "BU" denote a load put on the load-carrying platform 13.

Figure 2:
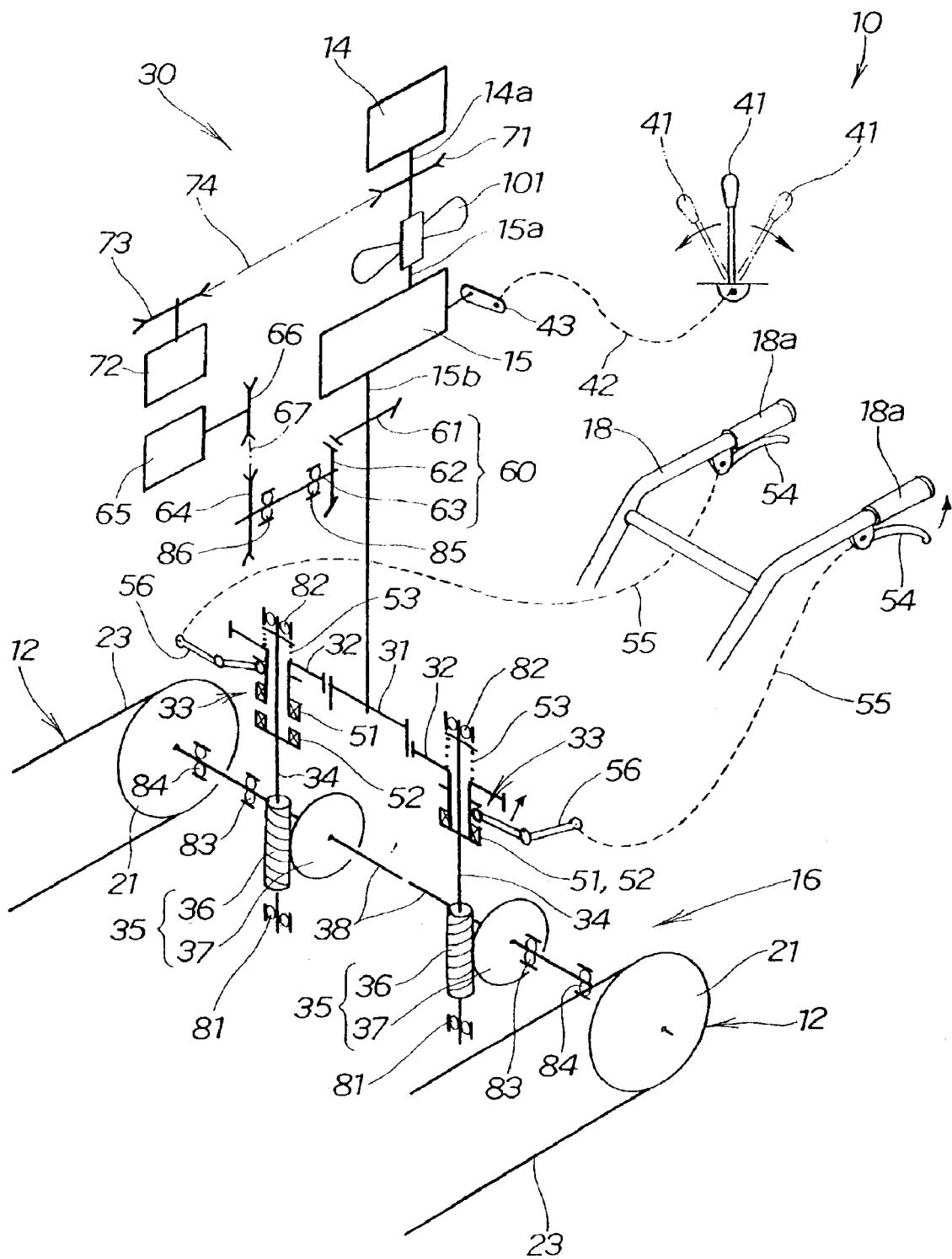
FIG. 2 is a schematic diagram of a power train of the self-propelled operating machine according to this invention.

FIG. 2 illustrates a schematized power train 30 in the self-propelled operating machine 10 of this invention. The power train 30 means a system from the engine 14 to the axles 38, 38 of the crawler belt units 12, 12. Specifically, the power train 30 transmits power from the engine 14 as a power source through the hydraulic CVT 15 to the transmission mechanism 16 and transmits the power from the transmission mechanism 16 to the left and right axles 38, 38.

The power train 30 has the engine 14, the hydraulic CVT 15 with an input shaft 15a connected to an output shaft 14a of the engine 14, a drive spur gear 31 provided on an output shaft 15b of the hydraulic CVT 15, left and right driven spur gears 32, 32 individually engaging the drive spur gear 31, left and right transmission shafts 34, 34 respectively having the left and right driven spur gears 32, 32, the left and right axles 38, 38 connected to the left and right transmission shafts 34, 34, a drive bevel gear 61 provided on the output shaft 15b of the hydraulic CVT 15, adjacent to the drive spur gear 31, a driven bevel gear 62 engaging the drive bevel gear 61, and a power take-off shaft 63 disposed between the left and right transmission shafts 34, 34, having the driven bevel gear 62.

More specifically, the output shaft 14a of the engine 14 extends downward from the engine 14. The input shaft 15a of the hydraulic CVT 15 extends upward from the hydraulic CVT 15. The output shaft 14a of the engine 14 is connected to the input shaft 15a of the hydraulic CVT 15. The output shaft 15b of the hydraulic CVT 15 extends downward from the hydraulic CVT 15. The drive bevel gear 61 and the drive spur gear 31 are mounted on the output shaft 15b above and below in this order. The drive spur gear 31 and the left and right driven spur gears 32, 32 engaging the drive spur gear 31 are transversely aligned. The left and right driven spur gears 32, 32 are connected to upper portions of the left and right transmission shafts 34, 34 via left and right clutches 33, 33. The left and right transmission shafts 34, 34 extend downward in parallel with the output shaft 15b of the hydraulic CVT 15. To lower portions of the left and right transmission shafts 34, 34, the left and right axles 38, 38 are connected via worm mechanisms 35, 35, respectively. On the ends of the left and right axles 38, 38, the left and right drive wheels 21, 21 are mounted, respectively.

The hydraulic CVT 15 is a combination of a hydraulic motor and a hydraulic pump. The hydraulic CVT 15 is a forward/reverse switchable CVT mechanism which allows transmission shifts with respect to the power of the engine 14 taken in through the input shaft 15a, between a neutral position for stopping the rotation of the output shaft 15b, a forward transmission zone for continuously varying the forward-rotation speed of the output shaft 15b, and a reverse transmission zone for continuously varying the reverse-rotation speed of the output shaft 15b.

A control lever 41 is a control member connected to a transmission control arm 43 via a wire cable 42.

The hydraulic CVT 15 stops the rotation of the output shaft 15b when the control lever 41 is in the neutral position shown by solid lines, and rotates the output shaft 15b in the forward direction when the control lever 41 is tilted left in the figure to a forward-travel position, and rotates the output shaft 15b in the reverse direction when the control lever 41 is tilted right in the figure to a rearward-travel position.

The hydraulic CVT 15 is a transmission system for transmitting power by hydraulic pressure, incorporating a relief valve for releasing the hydraulic pressure when a load above a certain level is applied. The relief valve can serve as a torque limiter against overload by appropriately setting a set pressure. This eliminates the need for an additional torque limiter, allowing reduced costs of the self-propelled operating machine 10.

The left and right driven spur gears 32, 32 are respectively mounted on the left and right driven shafts 34, 34 in a rotatable and axially-movable (i.e., vertically slidable) manner.

Each clutch 33 is a jaw clutch with a plurality of clutch claws 51 provided at the lower end of the driven spur gear 32, engaging a plurality of clutch claws 52 provided on an upper portion of the transmission shaft 34, and has a compression spring 53 resiliently biasing the driven spur gear 32 in the direction of engaging the clutch claws 51 positioned above with the clutch claws 52 positioned below. The clutch 33 is thus usually on (engaged).

When left and right clutch levers 54, 54 provided in the vicinities of left and right grips 18a and 18a on the operating handles 18 are operated, the arms 56, 56 are swung via the wire cables 55, 55, thereby lifting the driven spur gears 32, 32 against the resilient forces of the compression springs 53, 53. The resulting disengagement of the upper and lower clutch claws 51 and 52 causes clutch off.

To turn the self-propelled operating machine 10, the clutch lever 54 on the turning inside is operated to turn off the corresponding clutch 33 so as to prevent power transmission to the axle 38 on the turning inside.

The left and right worm mechanisms 35, 35 have left and right worms 36, 36 provided on the left and right vertical transmission shafts 34, 34, engaged with left and right wormwheels 37, 37 mounted on the left and right horizontal axles 38, 38, respectively. The left worm 36 and the right worm 36 are threaded inversely to one another.

The left and right worm mechanisms 35, 35 typically have self-locking functions. The "self-locking function" means the function of allowing power transmission from an input side to an output side while preventing power transmission from the output side to the input side. The worms 36, 36 in a stopped state are thus prevented from being driven by external forces through the worm wheels 37, 37.

The transmission mechanism 16 is a combination of the drive spur gear 31, left and right driven spur gears 32, 32, left and right clutches 33, 33, left and right transmission shafts 34, 34 and left and right worm mechanisms 35, 35. Since the drive spur gear 31 is mounted on the output shaft 15b of the hydraulic CVT 15, the output shaft 15b also serves as an input shaft of the transmission mechanism 16. The engine 14 can thus transmit power to the input shaft of the transmission mechanism 16 (i.e., the output shaft 15b) via the hydraulic CVT 15.

The power take-off shaft 63 disposed between the left and right transmission shafts 34, 34 is a rotary shaft extending horizontally toward the front of the vehicle body. A power take-off mechanism 60 consisting of a small number of components of the drive bevel gear 61, driven bevel gear 62 and power take-off shaft 63 is integrally incorporated into the transmission mechanism 16 for transmitting power from the engine 14 to the axles 38, 38.

A belt 67 running between a drive pulley 64 mounted on the power take-off shaft 63 and a driven pulley 66 mounted to a first external load 65, for example, allows taking the power of the engine 14 outside to drive the first external load 65 as desired.

The engine 14 has a power take-off pulley 71 mounted on the output shaft 14a. A belt 74 running between the power take-off pulley 71 and a second external load 72 allows taking the power of the engine 14 outside to drive the second external load 72 as desired.

In this manner, the power take-off shaft 63 at the output side of the hydraulic CVT 15 allows taking forward/reverse-rotation and variable-speed power, that is, power in a variable-rotation form. Further, the power take-off pulley 71 at the output side of the engine 14 allows taking power in an engine-direct-coupled form.

Thus, without complicating the power train 30, two types of power, power in a variable-rotation form and power in an engine-direct-coupled form can be taken outside and appropriately used in accordance with the types of loads. The simple configuration of the power train 30 results in the simple configuration of the self-propelled operating machine 10 in its entirety despite taking two types of power outside.

An air cooling fan 101 is provided on the input shaft 15a extended upward from the hydraulic CVT 15. Details of the air cooling fan 101 will be described below. In the figure, reference numerals 81 to 86 denote bearings.

Figure 3:
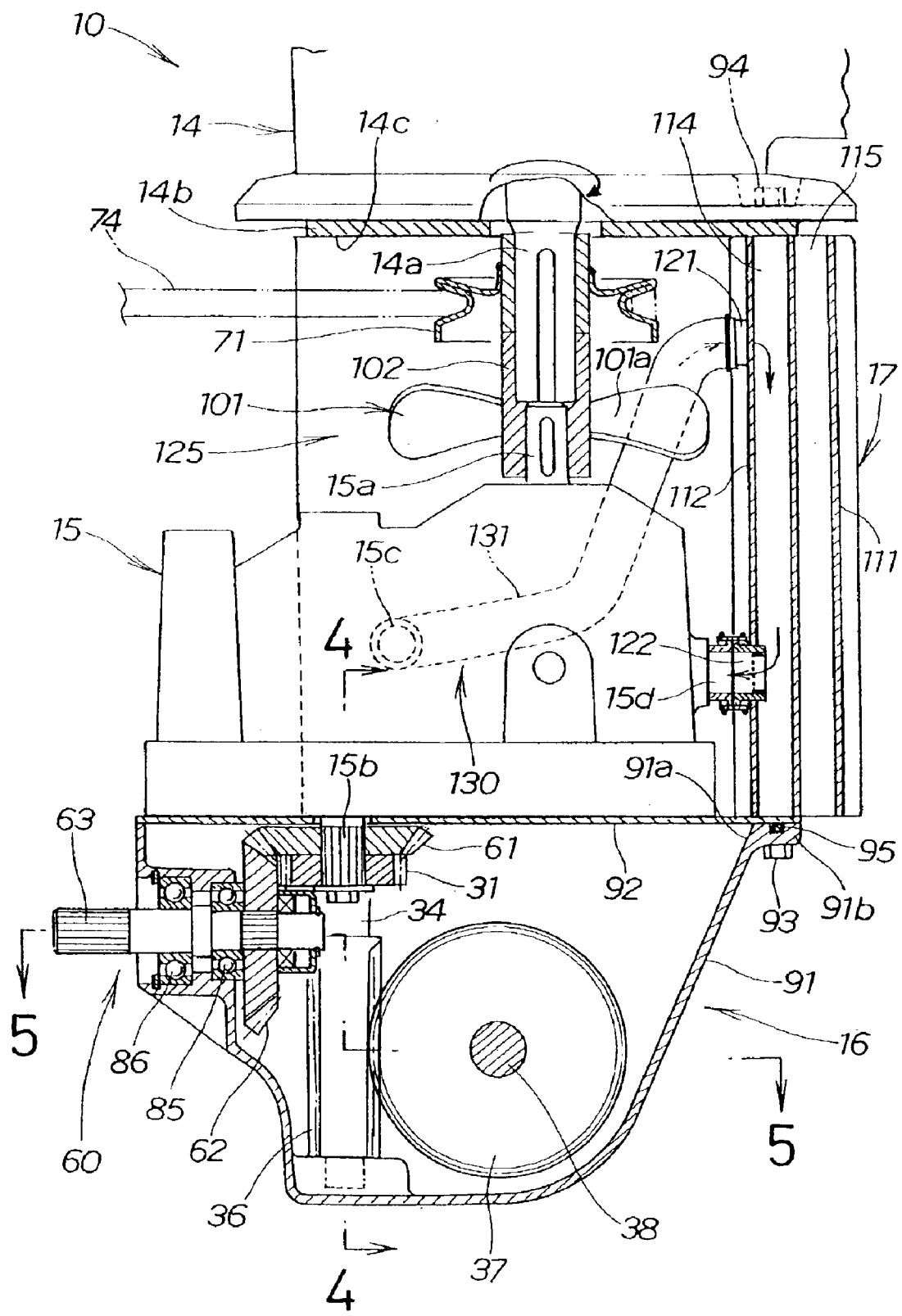
FIG. 3 is a cross-sectional view of an engine, hydraulic CVT, stand and transmission mechanism according to this invention.

As shown in FIG. 3, the hydraulic CVT 15 and the stand 17 are mounted on the transmission mechanism 16. The stand 17 extends to an upper level than the hydraulic CVT 15. On top of the stand 17, the engine 14 as a power source is mounted. The hydraulic CVT 15 has the output shaft 15b located forward of the input shaft 15a (leftward in the figure). The axle 38 is located rearward of the transmission shaft 34.

The members 31 to 38 constituting the transmission mechanism 16 described in FIG. 2 are housed in a transmission case 91 which opens upward. The transmission case 91 also houses the power take-off mechanism 60. A top opening 91a of the transmission case 91 is closed with a removable lid 92. The hydraulic CVT 15 and the stand 17 are each fixed on the lid 92 with a plurality of bolts 93. The engine 14 has a lower flange 14b and is fixed on the top surface of the stand 17 with a plurality of bolts 94 via the lower flange 14b. The lid 92 is a flat plate.

The air cooling fan 101 is provided on a coupling 102 connecting the output shaft 14a of the engine 14 and the input shaft 15a of the hydraulic CVT 15. The air cooling fan 101 has a plurality of blades 101a configured to send air from top to bottom when the output shaft 14a of the engine 14 rotates in an arrow direction in FIG. 3.

Figure 4:
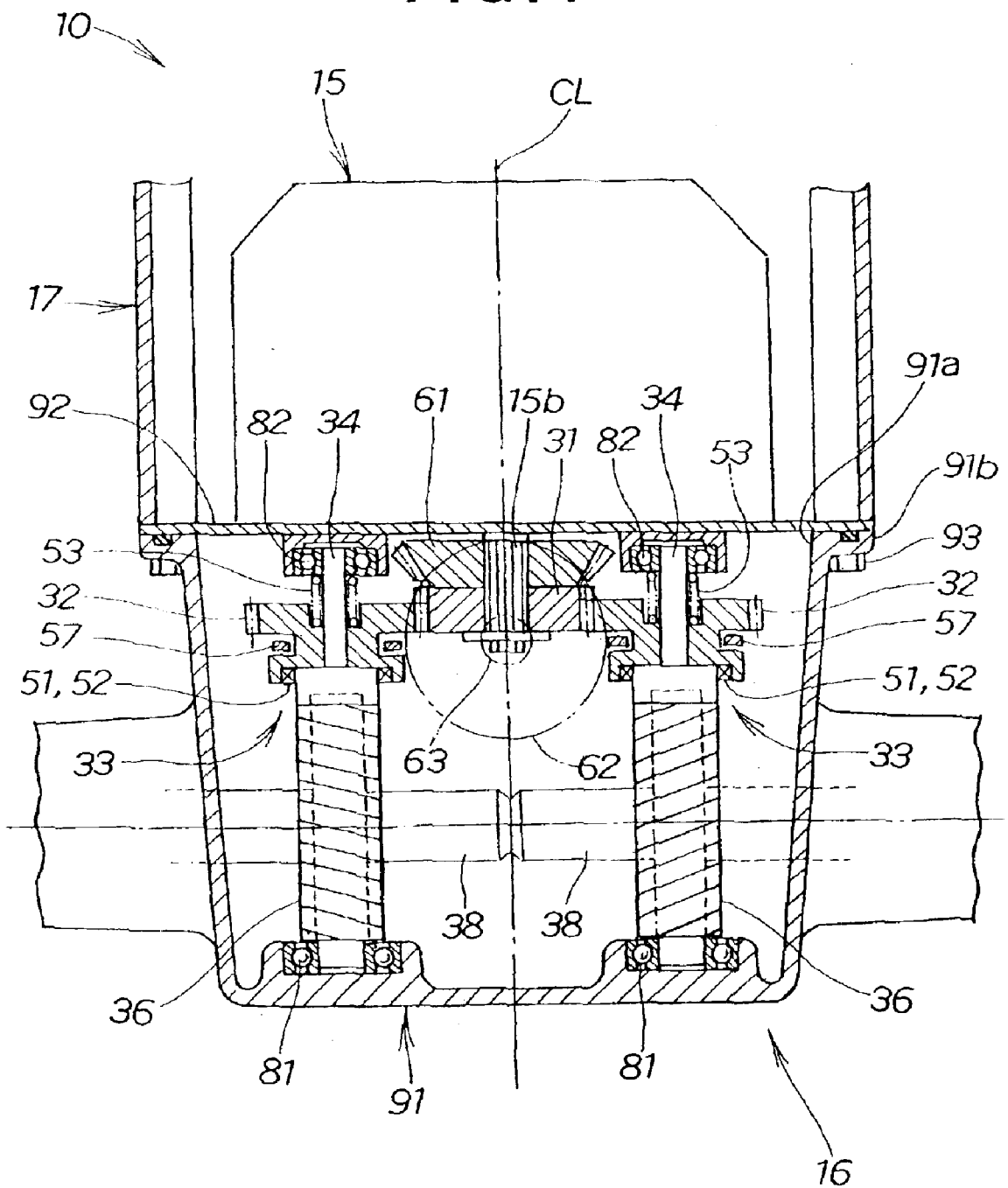
FIG. 4 is a cross-sectional view along line 4—4 in FIG. 3.

As shown in FIG. 4, the power take-off shaft 63 is disposed between the left and right transmission shafts 34, 34. The left and right transmission shafts 34, 34 are supported at their lower ends on the bottom of the transmission case 91 via the bearings 81, 81 and supported at their upper ends on the lid 92 via the bearings 82, 82.

Figure 5:
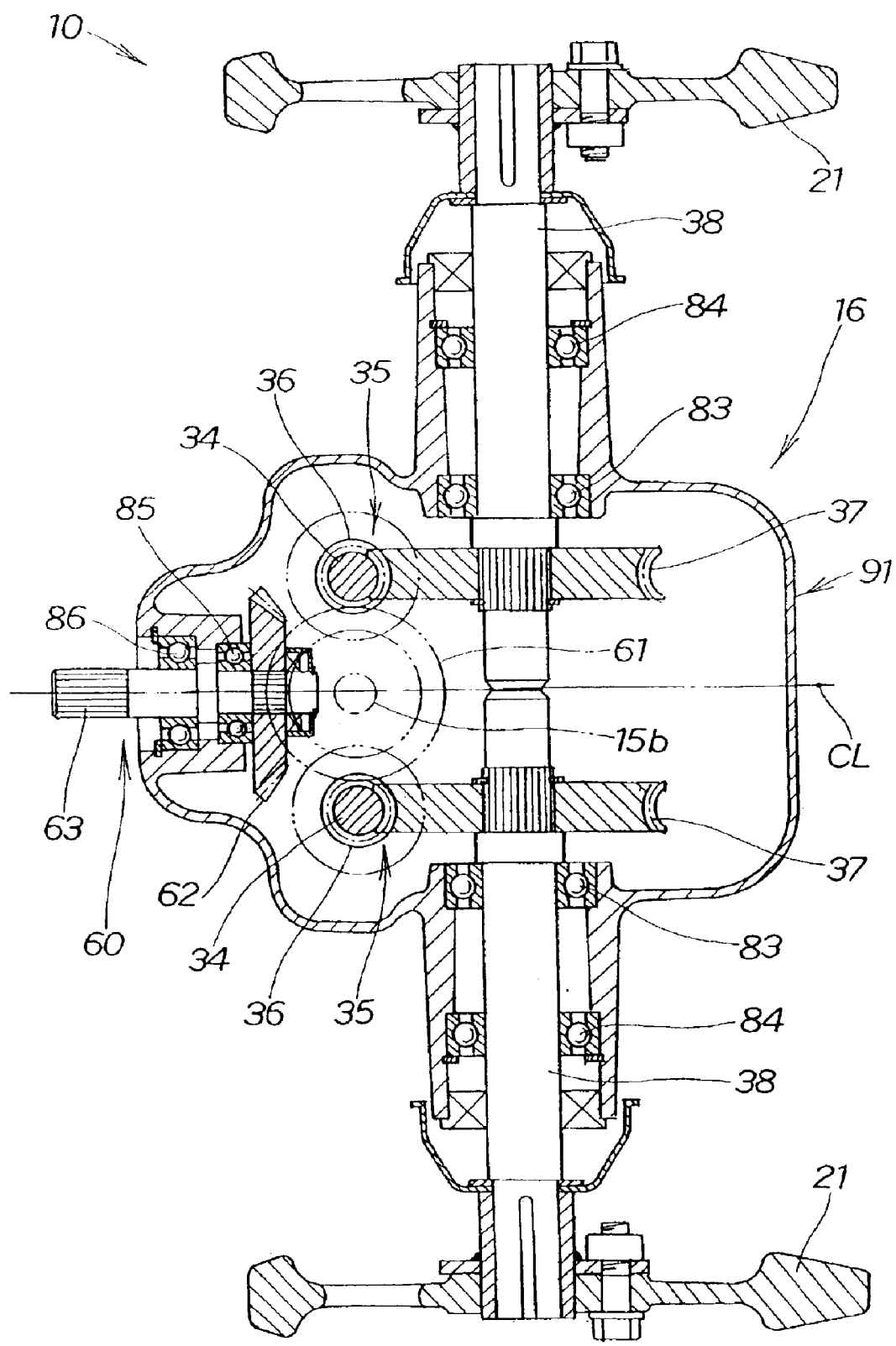
FIG. 5 is a cross-sectional view along line 5—5 in FIG. 3.

As shown in FIG. 5, the output shaft 15b of the hydraulic CVT 15 and the left and right transmission shafts 34, 34 are transversely (vertically in the figure) aligned. The output shaft 15b of the hydraulic CVT 15 and the power take-off shaft 63 are arranged in the operating machine center CL. The left and right axles 38, 38 are butted to one another to transversely align the left and right axles 38, 38.

Figure 6:
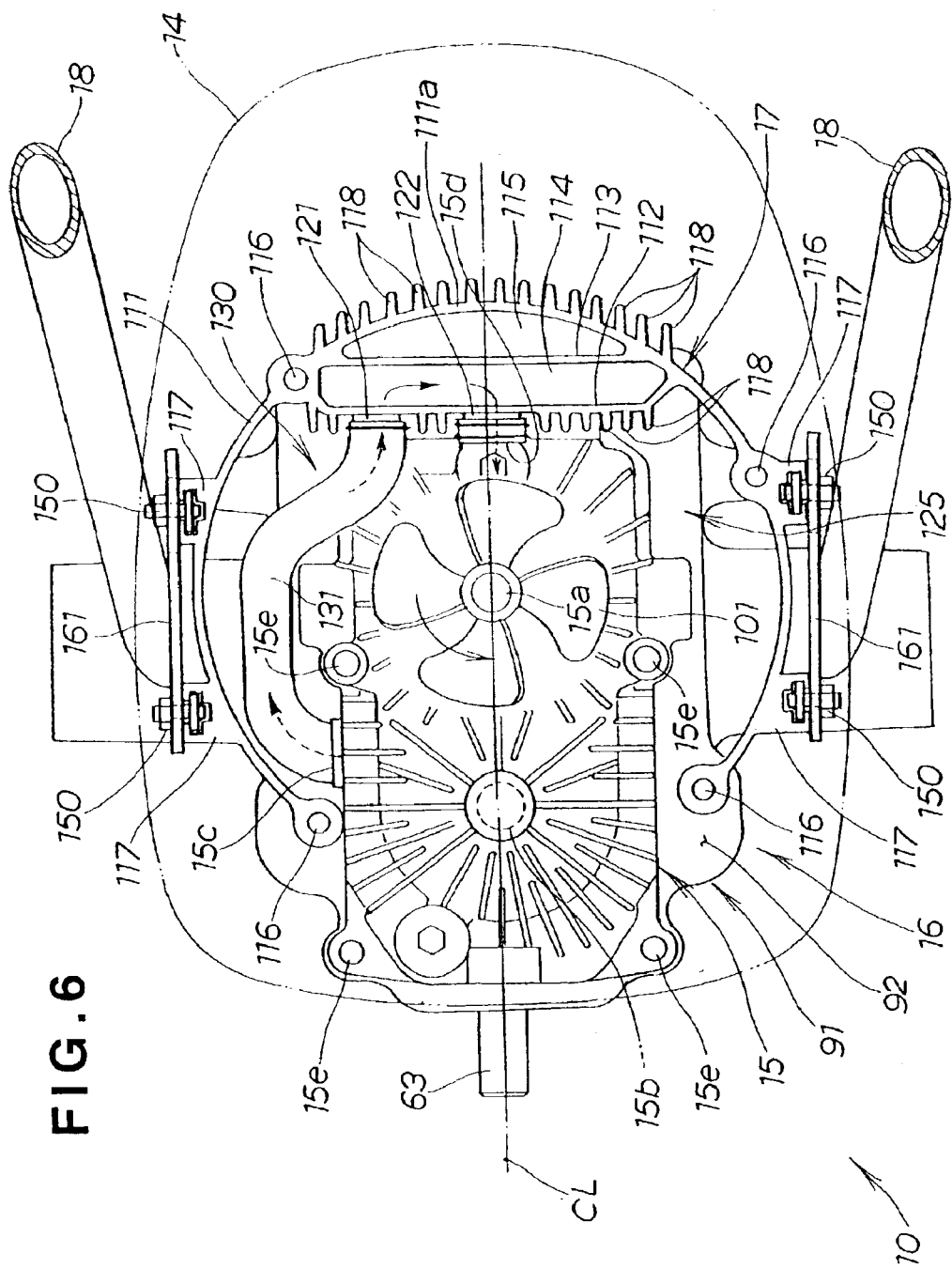
FIG. 6 is a plan view of the hydraulic CVT, stand and transmission mechanism with the engine removed.

FIG. 6 illustrates the hydraulic CVT 15, stand 17 and transmission mechanism 16 viewed from above with the engine 14 shown by imaginary lines removed.

The hydraulic CVT 15 with the input and output shafts 15a and 15b arranged in the operating machine center CL is enclosed by the stand 17. The stand 17 is a forward-opening member of a substantially C shape in a plan view, and is made from an aluminum (including aluminum alloy) extruded or drawn material.

The stand 17 also serves as an oil cooler in a single unit because it is made from an extruded or drawn material. This reduces the number of components and eliminates the need for a joining step such as welding.

More specifically, the stand 17 includes a stand body 111 of a certain thickness formed in a substantially C shape in a plan view with the opening front. The stand body 111 has front and rear two walls (front wall 112 and middle wall 113) formed at the bottom of the opening. The front wall 112 and middle wall 113 form a cooling passage 114 located forward. A portion 111a of the stand body 111 and the middle wall 113 form an air passage 115 located rearward of the cooling passage 114. The stand body 111 has four mounting bosses 116 formed at the front and rear and left and right. The stand body 111 further has four handle mounting portions 117 protruded leftward and rightward from the outer surface. The stand body 111 has a plurality of cooling fins 118 protruded from the rear outer surface constituting the part 111a of the stand body 111 and the outer surface of the front wall 112. The stand body 111 also has an oil inlet 121 and an oil outlet 122 which communicate with the cooling passage 114. The stand 17 is an integrally-molded product.

The stand body 111 is sized to be able to substantially enclose the hydraulic CVT 15. The exposure of about front one-third of the hydraulic CVT 15 from the stand body 111 has substantially no trouble. The opening width at the front of the stand body 111 is slightly larger than the width of the hydraulic CVT 15.

The front wall 112 and middle wall 113 are flat plates perpendicular to the operating machine center CL in a transverse direction. The cooling passage 114 is a space of a substantially rectangular shape in a plan view. The air passage 115 is a space constituting a part of a circle in a plan view.

Mounting flanges 161, 161 provided at the proximal ends of the operating handles 18 are fixed to the handle mounting portions 117 with fasteners 150 to allow the operating handles 18 to be extended rearward from the stand 17. An operator can thus control the operating handles 18 while walking.

In a conventional manner, the operating handles 18 are extended from the body of the self-propelled operating machine 10, thus limited in mounting space of the operating handles 18. In the present invention, the operating handles 18 are extended rearward from the stand 17 for mounting the engine 14 on the transmission mechanism 16, thus less limited in mounting space of the operating handles 18 as compared with the conventional manner. The mounting space of the operating handles 18 can thus be more easily provided.

Reference is returned to FIG. 3 to continue description. The stand 17 is superimposed on the lid 92 and bolted thereto to close the lower end of the cooling passage 114. The lower flange 14b is superimposed on the top surface of the stand 17 and bolted thereto to close the upper end of the cooling passage 114. The cooling passage 114 thus becomes a hermetically-sealed space. A plurality of upper and lower bolts 93 and 94 are fastened into the four mounting bosses 116 (see FIG. 6) formed at the stand body 111. Sealants are preferably interposed at the lower end and upper end of the cooling passage 114 to improve the sealing.

As shown in FIG. 3, the oil inlet 121 is arranged at an upper portion of the cooling passage 114 and the oil outlet 122 is arranged at a lower portion of the cooling passage 114. An oil circulation outlet 15c of the hydraulic CVT 15 (see also FIG. 6) and the oil inlet 121 are connected via a pipe (including a hose) 131, and an oil circulation inlet 15d of the hydraulic CVT 15 and the oil outlet 122 are connected, thereby forming an oil circulating passage 130.

The oil circulating passage 130 allows the hydraulic oil of the hydraulic CVT 15 to circulate from the hydraulic CVT 15 through the oil circulation outlet 15c, pipe 131, oil inlet 121, cooling passage 114, oil outlet 122 and oil circulation inlet 15d to the hydraulic CVT 15. That is, the hydraulic oil is cooled through the cooling passage 114.

The stand 17 is provided with the cooling passage 114 which cools the hydraulic oil of the hydraulic CVT 15 passed therethrough, thereby also serving as an oil cooler.

Figure 7:
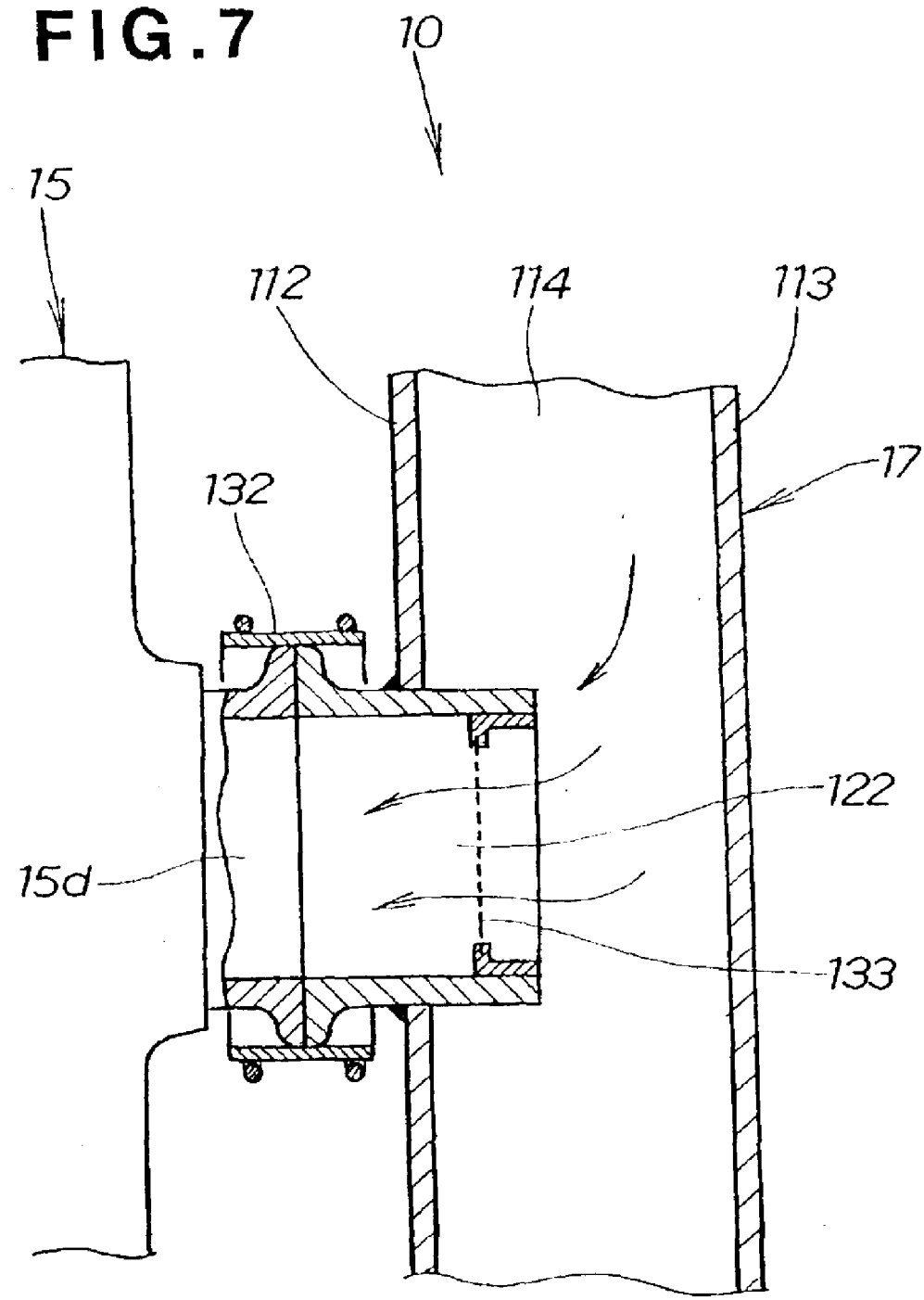
FIG. 7 is a cross-sectional view of an oil outlet of a cooling passage formed in the stand.

As shown in FIG. 7, the oil outlet 122 of the cooling passage 114 and the oil circulation inlet 15d of the hydraulic CVT 15 are connected with a joint 132. The oil outlet 122 has a filter 133 with a mesh of about 20 μm, preventing dust ingress into the hydraulic CVT 15.

Figure 8:
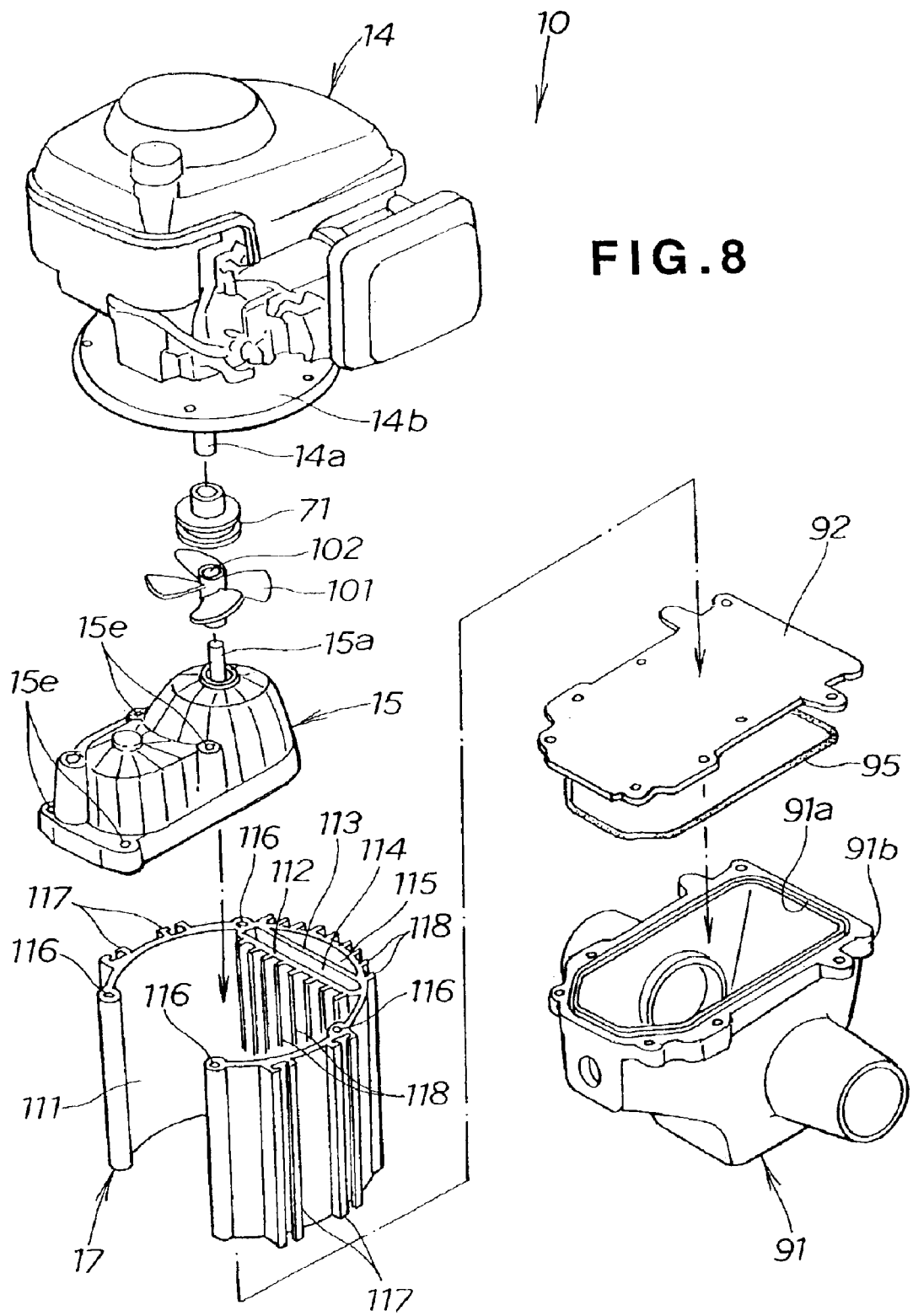
FIG. 8 is an exploded view of the engine, the hydraulic CVT, the stand and a transmission case according to this invention.

FIG. 8 illustrates in explosion the engine 14, hydraulic CVT 15, stand 17 and transmission case 91. The stand 17 is made from an extruded or drawn material as described above, so that the stand body 111, front wall 112, middle wall 113, cooling passage 114, airpassage 115, four mounting bosses 116, four handle mounting portions 117 and cooling fins 118 extend over the overall height of the stand 17.

To the upper flange 91b of the transmission case 91 and the lid 92, four mounting bosses 15e of the hydraulic CVT 15 are secured by bolting and also the four mounting bosses 116 of the stand 17 are secured by bolting at their lower ends. To the upper ends of the four mounting bosses 116 of the stand 17, the lower flange 14b of the engine 14 is secured by bolting. Reference numeral 95 denotes a sealant.

Figure 9:
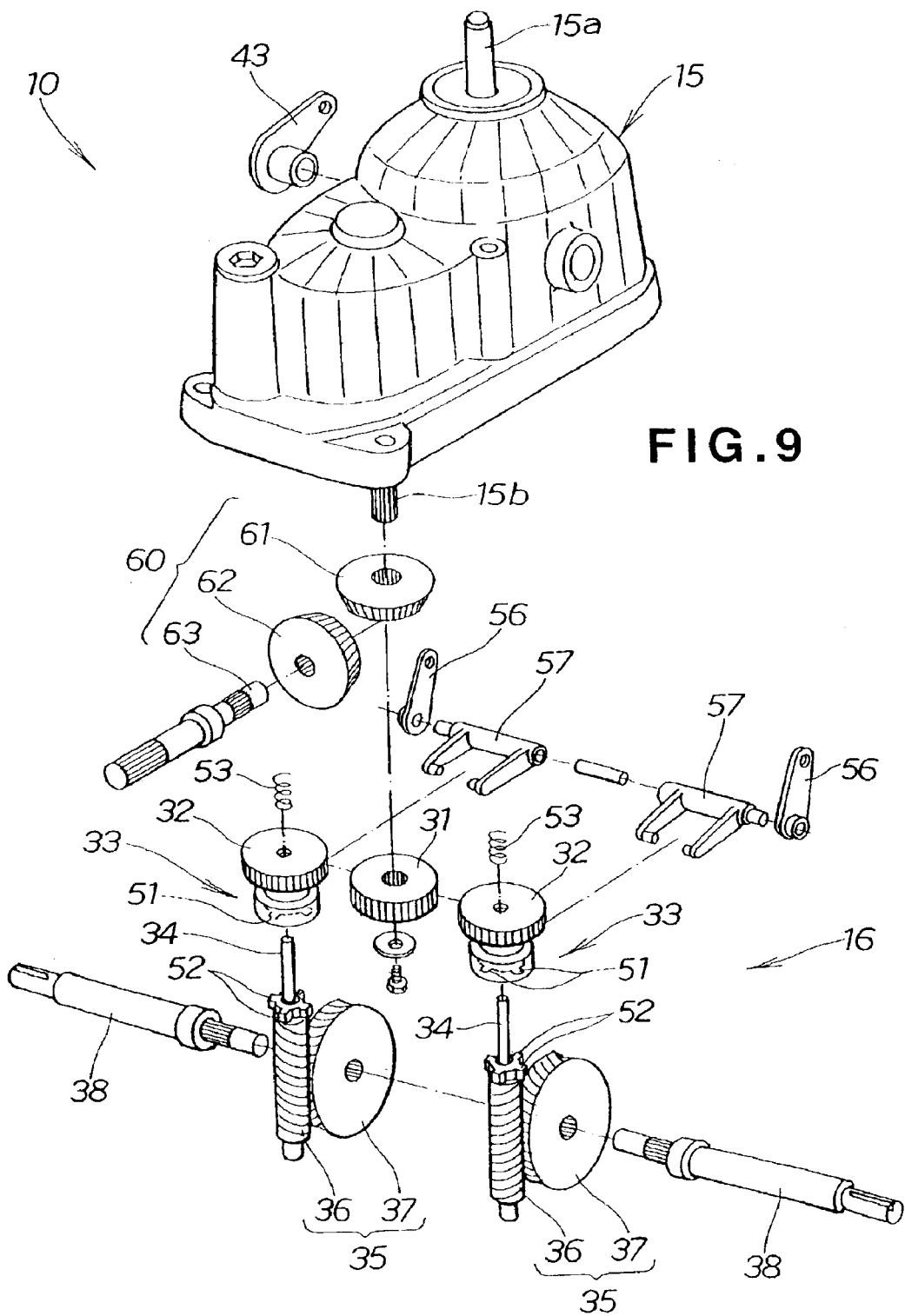
FIG. 9 is an exploded view of the hydraulic CVT, the transmission mechanism and axles according to this invention.

FIG. 9 is an exploded diagram of the hydraulic CVT 15, transmission mechanism 16 and axles 38, 38 according to the present invention, illustrating the arrangement relationships of components of the transmission mechanism 16 and the axles 38, 38 with respect to the hydraulic CVT 15. The arms 56, 56 of the clutches 33, 33 are control members mounted on shift forks 57, 57. With the shift forks 57, 57, the driven spur gears 32, 32 are moved upward to turn off the clutches 33, 33.

Now the function of the self-propelled operating machine 10 of the above configuration will be described with reference to FIGS. 2, 10 and 11.

In FIG. 2, the left and right driven spur gears 32, 32 are individually engaged with the drive spur gear 31 provided on the output shaft 15b of the hydraulic CVT 15, so that the transmission shafts 34, 34, on which the left and right driven spur gears 32, 32 are respectively provided, can be disposed on the left and right of the input shaft 15a, respectively. The left and right axles 38, 38 are connected to the left and right transmission shafts 34, 34 so that the power of the engine 14 can be transmitted to the left and right axles 38, 38.

The drive bevel gear 61 adjacent to the drive spur gear 31 is provided on the output shaft 15b and the power take-off shaft 63 having the driven bevel gear 62 engaging the drive bevel gear 61 is disposed between the left and right transmission shafts 34, 34, so that the power take-off shaft 63 is disposed in the vicinity of the left and right transmission shafts 34, 34 without interfering with the transmission shafts 34, 34.

In this manner, the power take-off mechanism 60 consisting of a small number of components of the drive bevel gear 61, driven bevel gear 62 and power take-off shaft 63 can be integrally incorporated into the transmission mechanism 16 for transmitting power from the engine 14 to the axles 38, 38. Further, the disposition of the power take-off shaft 63 in an empty space between the left and right transmission shafts 34, 34 prevents the transmission mechanism 16 from being large in size.

Despite the incorporation of the power take-off mechanism 60 into the transmission mechanism 16, the transmission mechanism 16 can thus be made small in size with the simple configuration. The power take-off mechanism 60 incorporated into the transmission mechanism 16 can easily take the power of the engine 14 outside.

Further, the transmission mechanism 16 of a small size and light weight results in a small size and light weight of the self-propelled operating machine 10 having the power take-off mechanism 60. There is no need to provide a different power take-off mechanism for taking power from the transmission mechanism outside 16 and a case for housing the mechanism.

Furthermore, the output shaft 15b of the hydraulic CVT 15 also serving as the input shaft of the transmission mechanism 16 eliminates the need for a different input shaft. This results in a small number of components. Further, since power is taken outside from the output side of the hydraulic CVT 15, the rotation direction and the number of revolutions of the power take-off shaft 63 can be desirably set. This allows the rotation direction and the number of revolutions of the first external load 65 actuated by the power taken outside to correspond with the rotation direction and the number of revolutions of the axles 38, 38. Thus workability with the first external load 65 can be further improved.

Figure 10:
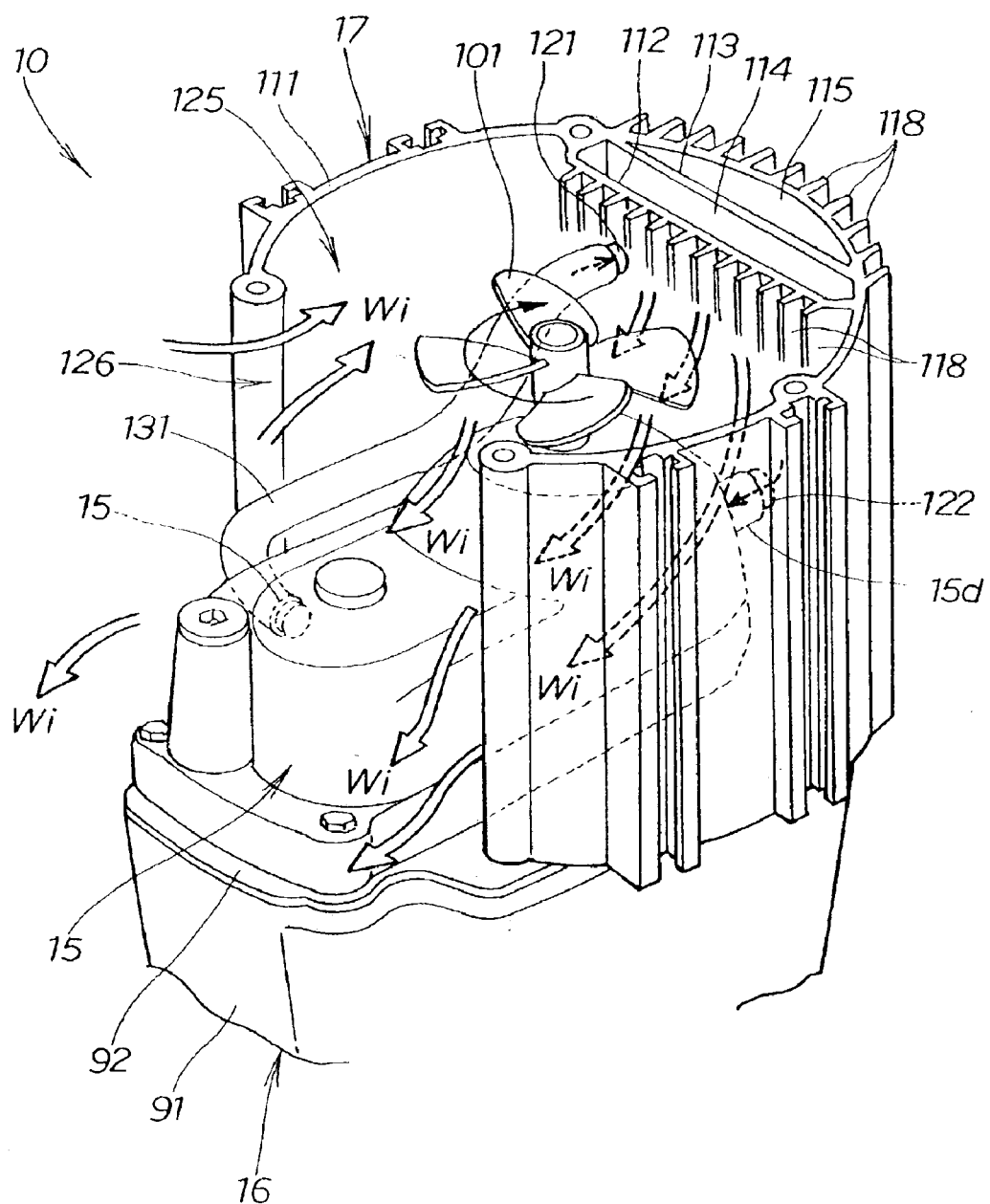
Figure 13A:
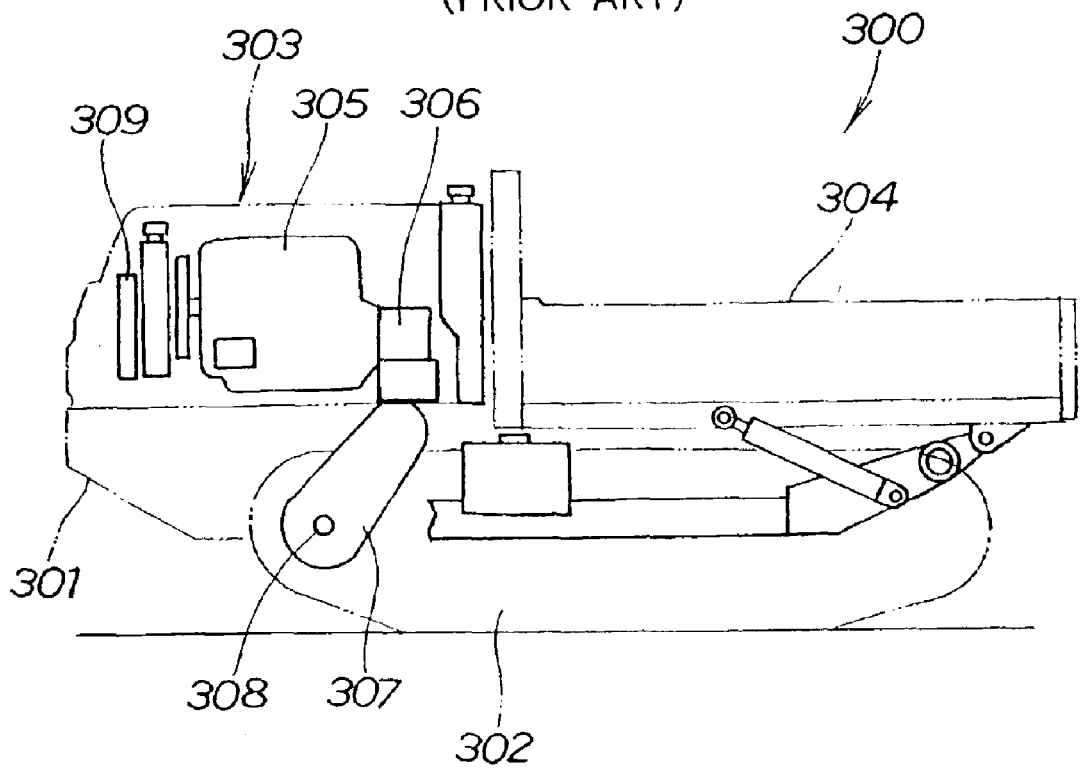
FIGS. 13A and 13B are schematic diagrams of the power train of the conventional self-propelled operating machine.
Figure 13B:
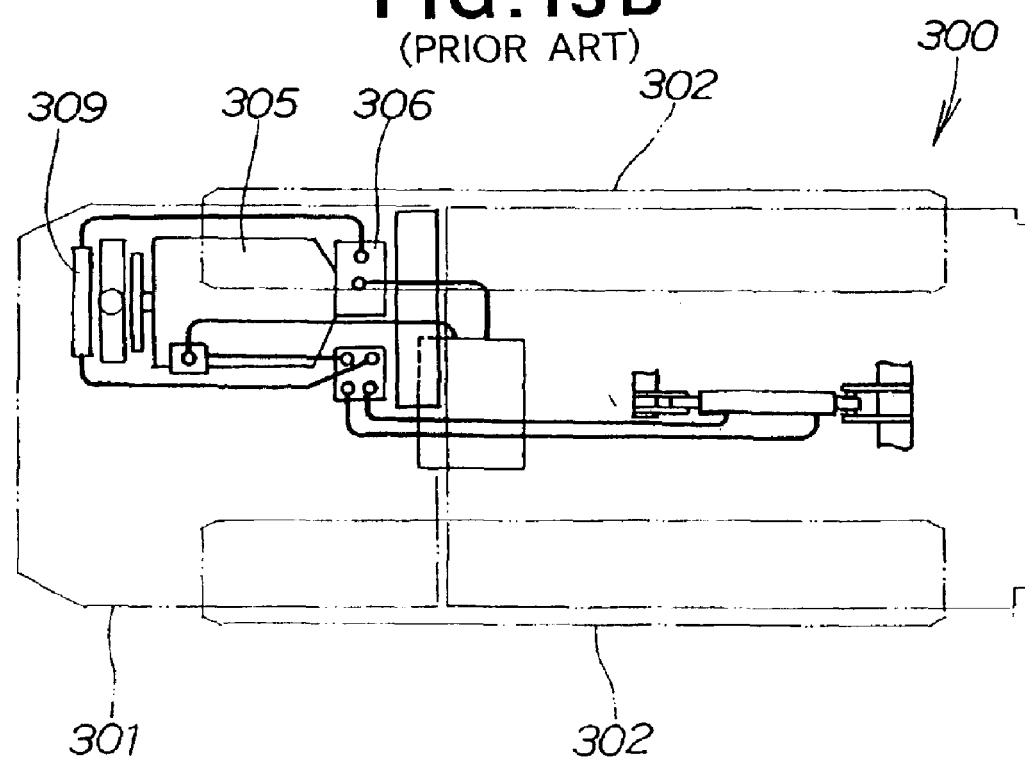

As shown in FIGS. 10 and 11, the stand 17 also serving as an oil cooler is a substantially C-shaped member in a plan view opening forward (leftward in the figures). A space 125 enclosed by the C shape is closed at the bottom by the lid 92 and closed at the top by the lower flange 14b of the engine 14. The hydraulic CVT 15 and the air cooling fan 101 are disposed in this space 125. In other words, the stand 17 encloses the hydraulic CVT 15 and the air cooling fan 101.

The air cooling fan 101 provided between the engine 14 and the hydraulic CVT 15 sends air Wi from top to bottom when rotating in a clockwise direction in a plan view. The air Wi introduced from an upper portion of the front opening 126 of the stand 17 by the air cooling fan 101 enters an upper portion of the space 125 as shown by hollow arrows, forcedly cooling an undersurface 14c of the engine 14, and then moves downward, forcedly cooling the inner wall surface of the stand body 111, front wall 112 and cooling fins 118 provided at the front wall 112, and is guided along the stand body 111 to move forward, forcedly cooling the outer surface of the hydraulic CVT 15, and is discharged outward from a lower portion of the front opening 126.

The outer wall surface of the stand body 111 and the cooling fins 118 provided at the outer wall surface are naturally cooled.

The cooling of the wall surface of the stand body 111, front wall 112 and cooling fins 118 results in the cooling of the cooling passage 114 connected thereto. As a result, hydraulic oil flowing through the cooling passage 114 serving as an oil cooler is cooled.

Thus by sending air from top to bottom with the air cooling fan 101, the cooling passage 114, the undersurface 14c of the engine 14 and the outer surface of the hydraulic CVT 15 are forcedly cooled. By naturally cooling the outer wall surface of the stand 17, the cooling passage 114 can also be cooled by natural cooling. The cooling passage 114 as an oil cooler, engine 14 and hydraulic CVT 15 can thus be cooled very efficiently.

As is clear from the above description, the cooling passage 114 for cooling the hydraulic oil of the hydraulic CVT 15 passed therethrough is provided inside the stand 17 to allow the stand 17 to also serve as an oil cooler for cooling the hydraulic oil. This eliminates the need for an oil cooler for that single purpose and an oil cooler mounting member. Installation space for the oil cooler can thus be reduced with the simple configuration to reduce the size of the self-propelled operating machine 10 and also reduce the number of components and production costs.

Further, the stand 17 also serving as an oil cooler is configured to enclose the hydraulic CVT 15, so that the distance between the oil cooler (cooling passage 114) and the hydraulic CVT 15 can be reduced. As a result, an oil pipe between the oil cooler and the hydraulic CVT 15 can be shortened.

In addition, the air cooling fan 101 is provided on the output shaft 14a extending downward from the engine 14 or the input shaft 15a extending upward from the hydraulic CVT 15, which eliminates the need for providing an additional space for disposing the air cooling fan 101. The air cooling fan 101 can thus be easily disposed in such a narrow space enclosed by the stand 17.

Further, the stand 17 can enclose the air cooling fan 101, thereby also serving as a fan cover. This eliminates the need for a fan cover, allowing reduction in the number of components.

Furthermore, the stand 17 also serving as an oil cooler and the hydraulic CVT 15 are mounted on the transmission mechanism 16, that is, on the transmission case 91, and the stand 17 is extended to a higher level than the hydraulic CVT 15 to mount the engine 14 thereon, so that the power train including the engine 14, hydraulic CVT 15 and transmission mechanism 16 can be put together. The simple configuration can further reduce the installation space for the power train to reduce the size of the self-propelled operating machine 10, and also simplify the fixing structure of fixing the power train.

FIGS. 12A and 12B illustrate the structure of mounting the operating handle 18 to the stand 17 and the function thereof.

As shown in FIG. 12A, the handle mounting portions 117, 117 extend over the overall height of the stand 17, and guide grooves 141, 141 formed in side surfaces of the handle mounting portions 117, 117 are elongated grooves also extending therethrough in the height direction of the stand 17.

The guide grooves 141, 141 are grooves of a T shape in cross-sectional view with a narrow opening width. The guide groove 141 in a T shape is a groove having an opening 142 of a narrow opening width and a groove 143 of a width larger than that of the opening 142 which are formed continuously inward from an outer surface 144 of the handle mounting portion 117 in this order.

Each fastener 150 consists of a slide base plate 151 in a plate shape, for example, a bolt 152 rising up from the plate surface of the slide base plate 151 and a nut 153 to be screwed onto the bolt 52. The slide base plate 151 is a member having a plate width smaller than the groove width of the groove 143 to be fitted movably along the groove 143 while restricted in rotation within the groove 143.

A handle base plate 161 at the base of the operating handle 18 has a single circular hole 162 formed in a base plate front end portion and upper and lower elongated holes 163, 163 formed rearward of the circular hole 162. The elongated holes 163, 163 are holes elongated in the extending direction of the operating handle 18.

The slide base plates 151 with the bolts 152 are fitted into the guide grooves 141, 141, and the nuts 153 are screwed onto the bolts 152 having inserted through the circular hole 162 and the elongated holes 163, 163, whereby the handle base plate 161 can be fixed to the handle mounting portions 117, 117 at a desired position with respect to the stand 17 as shown in FIG. 12B. In this manner, the operating handle 18 can be secured to the stand 17 at a desired position with the fasteners 150.

Also, as shown in FIG. 12C, the tilt of the handle base plate 161 with respect to the handle mounting portions 117, 117 can be changed to desirably set the mounting angle of the operating handle 18 with respect to the stand 17.

The operating handle 18 can be secured at a desired position to the stand 17 with the fasteners 150, which facilitates the adjustment in height and angle of the operating handle 18. An operator can desirably adjust the height and mounting angle of the operating handles 18 according to his or her preference.

In the above embodiment, the self-propelled operating machine 10 is not limited to a carrier vehicle and may be adapted to various operating machines such as snowplows and cultivators.

The stand 17 may be an aluminum (including aluminum alloy) die-cast material.

The power source is not limited to the engine 14 and may be an electric motor, for example.

It is also possible to alternatively provide the air cooling fan 101 on the output shaft 14a extending downward from the engine 14 and mount the power take-off pulley 71 on the input shaft 15a extended upward from the hydraulic CVT 15.

The present disclosure relates to the subject matters of Japanese Patent Applications, No. 2002-183209 and No. 2002-183261, both filed Jun. 24, 2002, the disclosures of which are expressly incorporated herein by reference in their entireties.

What is claimed is:

1. A self-propelled operating machine comprising:
a power source having an output shaft;
a hydraulic CVT for varying power outputted from the power source, the hydraulic CVT having an input shaft connected to the output shaft of the power source;
a transmission mechanism connected to the hydraulic CVT for transmitting power outputted from the hydraulic CVT;
a stand mounted on the transmission mechanism and supporting the power source, the stand extending from a lower section of the hydraulic CVT to an upper level above an upper section of the hydraulic CVT so as to enclose the hydraulic CVT, and the stand having an oil passage through which hydraulic oil of the hydraulic CVT flows; and
a cooling fan for cooling the oil passage of the stand to thereby cool the hydraulic oil of the hydraulic CVT flowing through the oil passage, the cooling fan being mounted on one of the input shaft of the hydraulic CVT and the output shaft of the power source and being disposed between the power source and the hydraulic CVT so as to be enclosed by the stand.

2. An operating machine according to claim 1; further comprising a pair of operating handles extending rearwardly from the stand to allow an operator to control the operating handles to maneuver the operating machine along a ground surface while the operator walks along the ground surface.

3. An operating machine according to claim 2; further comprising a plurality of guide grooves formed along a longitudinal axis of the stand, and a plurality of fasteners for engagement with respective ones of the guide grooves to removably connect the operating handles along the longitudinal axis of the stand while preventing relative rotation between the operating handles and the stand.

4. An operating machine according to claim 1; wherein the stand has an end open to the exterior of the operating machine.

5. An operating machine according to claim 1; wherein the stand is generally C-shaped in cross-section.

6. An operating machine according to claim 1; further comprising a body frame, a plurality of axles mounted on the body frame to undergo rotation, and a plurality of wheels mounted on respective ones of the axles for rotation therewith; wherein the transmission mechanism transmits the power outputted by the hydraulic CVT to the axles to thereby rotationally drive the wheels.

7. A self-propelled operating machine comprising:
a power source;
a hydraulic CVT for varying power outputted from the power source;
a transmission mechanism connected to the hydraulic CVT for transmitting power outputted from the hydraulic CVT;
a stand disposed between the transmission mechanism and the power source and enclosing the hydraulic CVT, the stand having an oil passage through which hydraulic oil of the hydraulic CVT flows; and
a cooling fan for cooling the oil passage of the stand to thereby cool the hydraulic oil of the hydraulic CVT flowing through the oil passage, the cooling fan being disposed between the power source and the hydraulic CVT so as to be enclosed by the stand.

8. A self-propelled operating machine according to claim 7; wherein the stand has an interior space in which the hydraulic CVT and the cooling fan are disposed, and a pair of walls extending in the interior space and spaced-apart from one another to form therebetween the oil passage of the stand.

9. A self-propelled operating machine according to claim 8; wherein the stand is generally C-shaped.

10. A self-propelled operating machine according to claim 8; wherein the stand has an outer peripheral surface and a plurality of guide grooves disposed on the outer peripheral surface and extending along a longitudinal axis of the stand.

11. A self-propelled operating machine according to claim 10; further comprising a pair of handles manually operable by an operator to maneuver the self-propelled operating machine, and connecting means for integrally removably connecting the operating handles to respective ones of the guide grooves of the stand at any one of preselected positions along the longitudinal axis of the stand.

12. A self-propelled operating machine according to claim 11; wherein the connecting means includes means for preventing relative rotation between the handles and the stand when the handles are connected to the stand.

13. A self-propelled operating machine according to claim 7; wherein the stand is generally C-shaped.

14. A self-propelled operating machine according to claim 7; wherein the stand is integrally molded from a single piece of material.

15. A self-propelled operating machine according to claim 7; further comprising a pipe for supplying hydraulic oil from the hydraulic CVT to the oil passage of the stand.

16. A self-propelled operating machine according to claim 7; wherein the stand has an upper end connected to the power source and a lower end connected to the transmission mechanism; and wherein the oil passage of the stand extends from the upper end to the lower end thereof.

17. A self-propelled operating machine according to claim 16; wherein the oil passage of the stand has an upper open end and a lower open end; and wherein the power source has a flange member covering the upper open end of the oil passage and the transmission mechanism has a cover covering the lower open end of the oil passage.

* * * * *